(12) United States Patent
Zahuranec et al.

(10) Patent No.: US 10,060,102 B2
(45) Date of Patent: Aug. 28, 2018

(54) PLUMBING SUPPLY BOXES

(71) Applicant: OATEY CO., Cleveland, OH (US)

(72) Inventors: Terry L. Zahuranec, North Olmsted, OH (US); Matthew L. Schmidt, Avon, OH (US)

(73) Assignee: OATEY CO., Cleveland, OH (US)

( * ) Notice: Subject to any disclaimer, the term of this patent is extended or adjusted under 35 U.S.C. 154(b) by 161 days.

(21) Appl. No.: 14/697,245

(22) Filed: Apr. 27, 2015

(65) Prior Publication Data

US 2015/0225931 A1  Aug. 13, 2015

Related U.S. Application Data

(63) Continuation of application No. 12/205,427, filed on Sep. 5, 2008, now abandoned.

(60) Provisional application No. 61/077,671, filed on Jul. 2, 2008.

(51) Int. Cl.
| | |
|---|---|
| *A62C 2/06* | (2006.01) |
| *E03C 1/02* | (2006.01) |
| *F16L 5/00* | (2006.01) |

(52) U.S. Cl.
CPC .............. *E03C 1/021* (2013.01); *A62C 2/065* (2013.01); *F16L 5/00* (2013.01); *Y10T 137/698* (2015.04)

(58) Field of Classification Search
CPC ............................ Y10T 137/698; A62C 2/065
USPC ......................................................... 220/3.3
See application file for complete search history.

(56) References Cited

U.S. PATENT DOCUMENTS

| | | |
|---|---|---|
| 1,734,361 A | 11/1929 | Bloom |
| 2,270,469 A | 1/1942 | Osborn, Jr. |
| 2,670,919 A | 3/1954 | Esoldi |
| 2,736,338 A | 2/1956 | Britton |
| 2,952,271 A | 9/1960 | Charles et al. |
| 3,834,781 A | 9/1974 | Logsdon |
| 3,927,785 A | 12/1975 | Kinney et al. |
| 4,158,471 A | 6/1979 | Logsdon |
| 4,410,004 A | 10/1983 | Kifer et al. |
| 4,556,084 A | 12/1985 | Frawley |
| 4,628,959 A | 12/1986 | Parker et al. |
| 4,637,422 A | 1/1987 | Izzi |

(Continued)

OTHER PUBLICATIONS

IPS Corporation Guy Gray "FR-12" Series of Fire Rated Outlet Boxes, (with Specification Submittal Sheet), Undated, 2 pages.

(Continued)

*Primary Examiner* — Kevin Murphy
(74) *Attorney, Agent, or Firm* — Baker & Hostetler LLP (57) ABSTRACT

Plumbing supply boxes may be made of a thermoset plastic material that will not melt or permit the boxes to collapse inside a wall if subjected to flames or high temperatures resulting from a fire. If the thermoset plastic boxes have a drain opening, a thermoplastic tubular drain adaptor may be connected thereto that can be solvent welded. Relatively small intumescent pads may be installed in close proximity to the drain opening which, if subjected to flames or high temperature caused by a fire, will expand and form an insulating char that seals off the drain opening. The boxes may be slidable in opposite directions along adjustable support brackets to permit the boxes to be mounted in any desired position in stud bays having different spacings between the stud walls for ease of alignment of one or more openings in the box with in-wall plumbing.

14 Claims, 7 Drawing Sheets

(56) References Cited

U.S. PATENT DOCUMENTS

| | | | |
|---|---|---|---|
| 4,867,802 A | | 9/1989 | Earl |
| 4,934,410 A | | 6/1990 | Humber |
| 5,044,582 A | * | 9/1991 | Walters .................. H02G 3/126 248/200.1 |
| 5,048,562 A | | 9/1991 | Frawley |
| 5,155,957 A | | 10/1992 | Robertson et al. |
| 5,452,551 A | * | 9/1995 | Charland ............... A62C 2/065 52/1 |
| 5,497,584 A | | 3/1996 | Bergmann |
| RE35,532 E | * | 6/1997 | Duren .................... E03C 1/122 137/516.15 |
| 5,653,254 A | | 8/1997 | Condon et al. |
| 5,970,670 A | * | 10/1999 | Hoffman .................. F16L 5/04 285/192 |
| 5,983,929 A | | 11/1999 | Andersson |
| 6,125,881 A | | 10/2000 | Hobbs et al. |
| 6,148,850 A | | 11/2000 | Kopp et al. |
| 6,155,286 A | | 12/2000 | Geary |
| 7,082,730 B2 | * | 8/2006 | Monden .................... F16L 5/04 138/161 |
| 7,140,397 B2 | | 11/2006 | Shaffer et al. |
| 7,204,267 B1 | | 4/2007 | Persico |
| 7,270,144 B2 | | 9/2007 | Minnick |
| 7,348,484 B1 | * | 3/2008 | Ackerman ........... H02G 3/0412 174/50 |

OTHER PUBLICATIONS

Metacaulk (R) Firestopping Products, taken from www.metacaulk.com/fp2.htm, Nov. 8, 2007, 11 pages.
ProSet Systems Firestop Penetrator, Fire Guard Ice Maker Box, W.H. Directory Reference 05 Edition, Firestop Device (installation instructions), Jan. 20, 2005, 1 page.

\* cited by examiner

PLUMBING SUPPLY BOXES

CROSS-REFERENCE TO RELATED APPLICATIONS

This application is a continuation of application Ser. No. 12/205,427, filed Sep. 5, 2008, which claims the benefit of U.S. Provisional Application No. 61/077,671, filed Jul. 2, 2008, the entireties of which are incorporated herein by reference.

FIELD OF THE INVENTION

The present invention relates to plumbing supply boxes that are installable in wall recesses for connecting one or more water shut-off valves and/or drain lines to in-wall plumbing.

BACKGROUND OF THE INVENTION

Plumbing supply boxes are commonly used to connect hot and/or cold water supply lines and/or one or more waste drains to appliances and plumbing fixtures such as washing machines, icemakers, water softeners, sinks, toilets and the like. Oftentimes these boxes are molded out of a suitable thermoplastic material to enable any drain outlets to be solvent welded to thermoplastic drain pipes.

If these thermoplastic supply boxes are to be recess mounted in walls that are fire rated, the boxes must be similarly fire rated to insure that the original fire rating of the walls is maintained even though the boxes may melt and collapse inside the walls when subjected to flames or high temperatures caused by a fire. Heretofore one known way to obtain the requisite fire rating for thermoplastic supply boxes was to make the walls of the boxes thicker to better withstand heat and attach a relatively large intumescent pad to the back side of the boxes. Accordingly, should the boxes be subjected to sufficient heat to cause the boxes to melt and collapse inside the walls, the heat will also cause the intumescent material to expand sufficiently to form a hard char to seal off the wall opening previously occupied by the boxes and thereby restore the walls to the original fire rating.

A major disadvantage in using such intumescent pads to achieve the requisite fire rating for thermoplastic supply boxes is the relatively high cost of the intumescent pads and poor structural integrity of the supply boxes at high temperatures.

SUMMARY OF THE INVENTION

The present invention provides fire rated plumbing supply boxes that are less costly than previous known fire rated thermoplastic supply boxes and have a higher degree of structural integrity at high temperatures. Also the plumbing supply boxes of the present invention may easily be mounted in any desired position in stud bays having different spacings between the stud walls and also be easily aligned with in-wall plumbing.

In accordance with one aspect of the invention, the plumbing supply boxes may be made of a thermoset plastic fire rated material that will not melt or collapse inside a fire rated wall when subjected to flames or high temperatures caused by a fire.

In accordance with another aspect of the invention, the thermoset plastic supply boxes may include one or more drain openings containing a thermoplastic tubular drain adaptor to which thermoplastic drain pipes can be solvent welded.

In accordance with another aspect of the invention, a relatively small amount of intumescent material may be installed in close proximity to the thermoplastic drain adaptor, whereby if the boxes are exposed to enough heat to cause the drain adaptor to melt, the intumescent material will expand and form an insulating char that seals off the associated drain opening.

In accordance with another aspect of the invention, the supply boxes may be field convertible to different valve and drain outlet options.

In accordance with another aspect of the invention, adjustable support brackets may be used to mount the supply boxes in stud bays having different spacings between the stud walls.

In accordance with another aspect of the invention, the supply boxes may be slidable along the support brackets within stud bays to allow the boxes to be aligned with in-wall plumbing.

These and other objects, advantages, features and aspects of the invention will become apparent as the following description proceeds.

To the accomplishment of the foregoing and related ends, the invention, then, comprises the features hereinafter more fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE INVENTION

Figure 1:
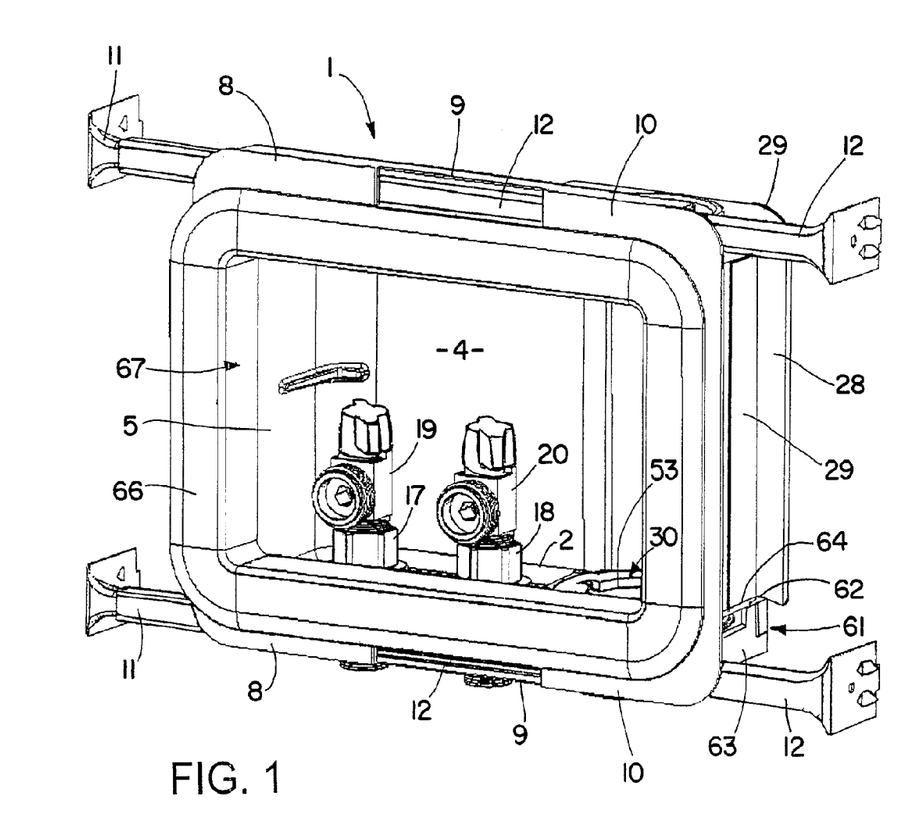
FIG. 1 is a front perspective view of one form of plumbing supply box of the present invention.
Figure 2:
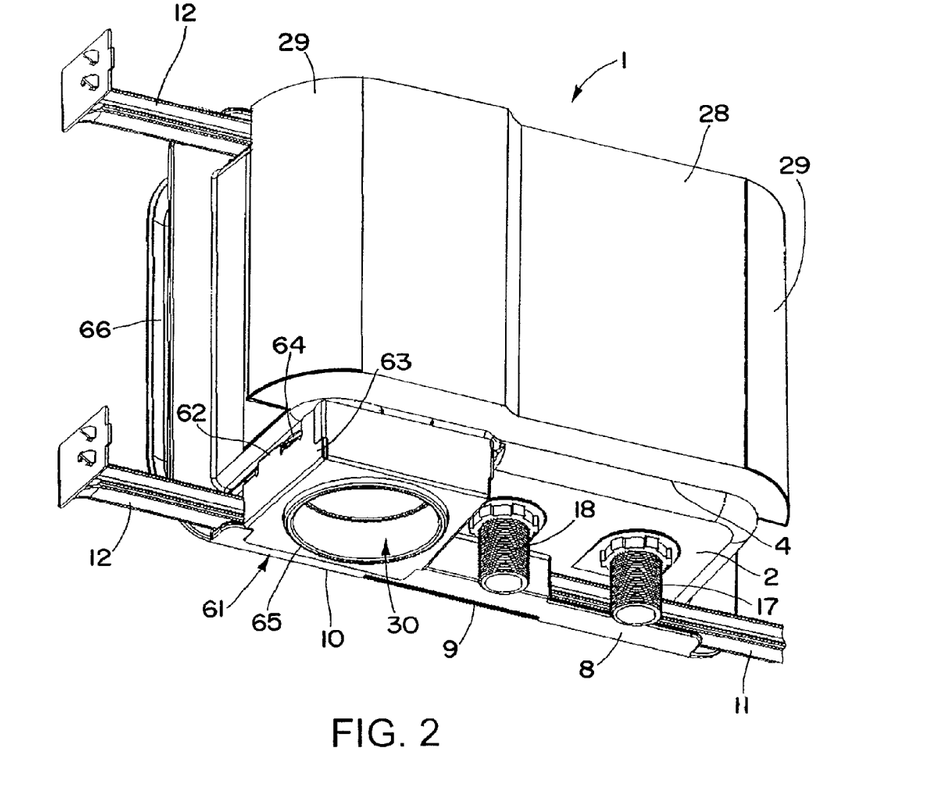
FIG. 2 is a rear perspective view of the plumbing supply box of FIG. 1.
Figure 3:
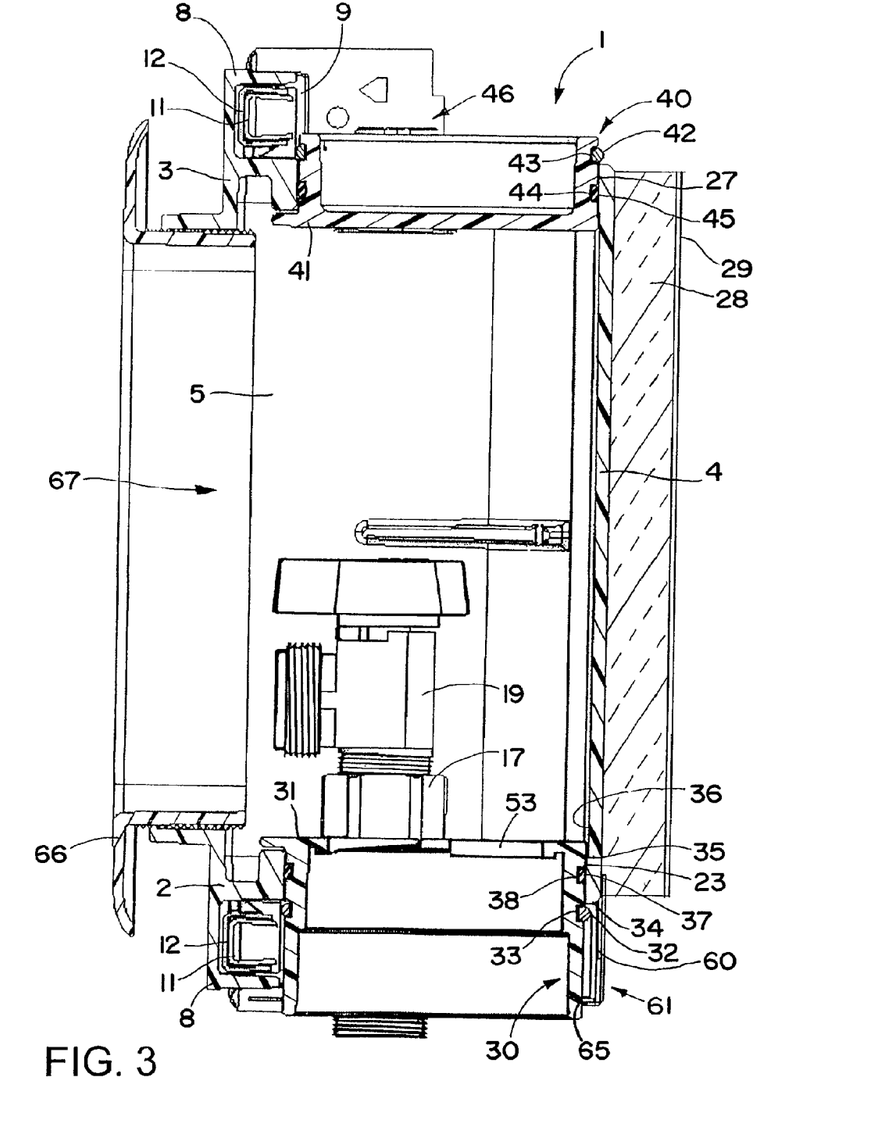
FIG. 3 is an enlarged fragmentary transverse section through the plumbing supply box of FIG. 1.

Referring now in detail to the drawings, wherein the same reference numbers are used to designate like parts, and initially to FIGS. 1-5, there is shown one form of plumbing supply box 1 of the present invention that may be installable in a wall recess (not shown) for connecting one or more water shut-off valves and/or drain lines to in-wall plumbing in a manner well known in the art. The box includes bottom and top walls 2, 3, rear wall 4 and side walls 5, 6. One or both of the top and bottom walls may include alternately rearwardly and forwardly facing aligned channels 8, 9, 10 for receipt of respective pairs of adjustable metal support brackets 11, 12 that may be telescopically connected together as shown in FIGS. 1 and 3. This permits the support brackets to be moved in or out relative to one another for securely mounting the box between stud walls in a stud bay having different spacings therebetween (for example, 16 inch to 24 inch spacing). In addition, this permits the box to be slid along the support brackets in opposite directions within the stud bay for aligning the box with in-wall plumbing (not shown). The outer ends of the support brackets may be securely mounted to stud walls made of wood, composite or metal using suitable fasteners such as nails or screws.

Any number of openings may be provided in the bottom wall 2 of the box for connecting one or more shut-off valves mounted inside the box to one or more water supply lines and/or for connecting the box to a sanitary drain line. In the embodiment shown in FIGS. 1-5, two openings 15, 16 are provided in the bottom wall for mounting conduit fittings 17, 18 to which shut-off valves 19, 20 are connected inside the box to open and close off hot and/or cold water supply lines 21, 22 extending from the conduit fittings (see FIG. 5). Also a third opening 23 is provided in the bottom wall adjacent one side of the box for connection to a drain line (not shown). Corresponding openings 25, 26 may also be provided in the top wall 3 of the box (see FIG. 5) for mounting the conduit fittings for the shut-off valves for connection to top water supply lines. Likewise the top wall may have a third opening 27 substantially in line with the third opening 23 in the bottom wall 2 that may provide a drain port if the box is mounted upside down to accommodate either a right hand drain arrangement or a left hand drain arrangement as desired. The third opening 23 or 27 that is not used as a drain port may be plugged, as may the other openings 15, 16 or 25, 26 to which conduit fittings for water shut-off valves are not connected as described hereafter.

In accordance with the present invention, the box 1 is desirably made out of a suitable thermoset plastic fire-rated material such as fiber reinforced bulk molding compound (BMC) or phenolic that will not melt or collapse inside the wall when exposed to flames or high heat. Similarly, the plugs that are used to close off the openings to which the conduit fittings for the water shut-off valves and water supply lines are not connected and the drain outlet or outlets to which the drain line is not connected may be made of a similar type thermoset plastic material or other material that will not melt or collapse when subjected to flames or high temperatures resulting from a fire. Moreover, the adjustable support brackets 11, 12 may be made of a suitable metal or other material that will withstand the flames or high temperatures resulting from a fire.

Figure 4:
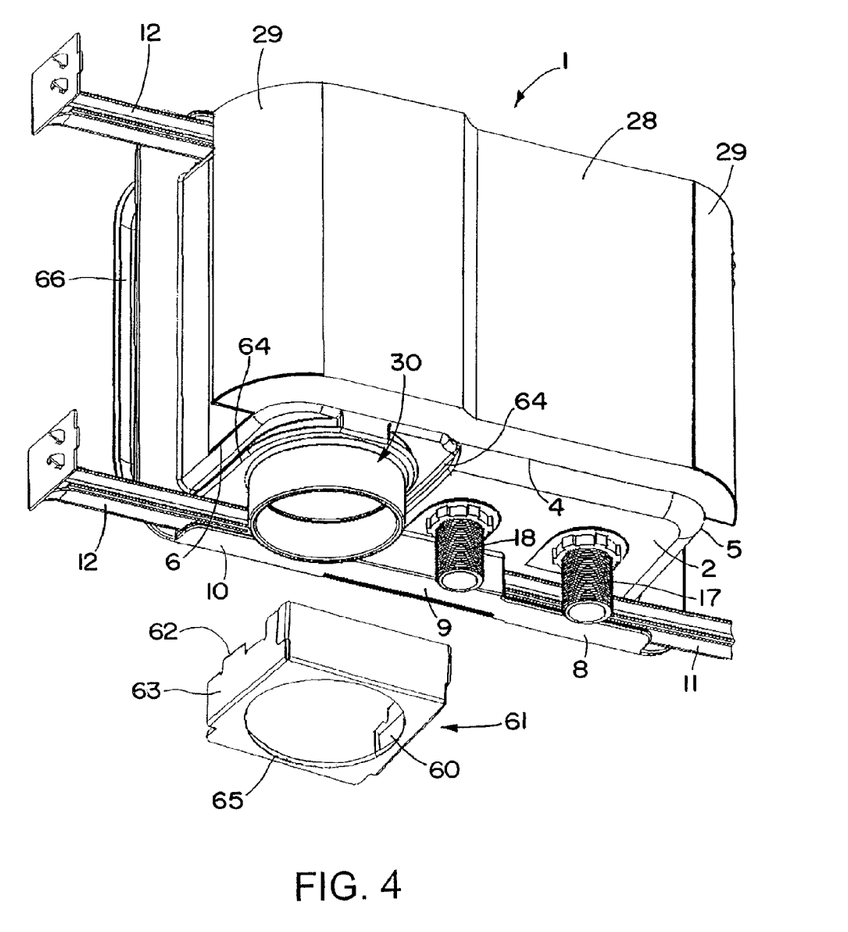
FIG. 4 is a rear perspective view of the plumbing supply box similar to FIG. 2 but showing an enclosure containing a small quantity of intumescent material removed from the bottom of the box.

If needed to obtain the required fire rating for the boxes, a suitable insulation pad 28 may be attached to the back wall 4 of the boxes in any suitable manner, for example, by taping both ends of the pad to the sides of the boxes using a suitable tape such as foil tape 29 to hold the insulation pad in place as shown, for example, in FIGS. 2 and 4. Other suitable fasteners including screws, snap fasteners, or adhesives and the like could also be used to secure the insulation pads in place if desired. The insulation layer 28 may have a foil backing to reflect heat and hold the insulating material together.

Figures 5, 6:
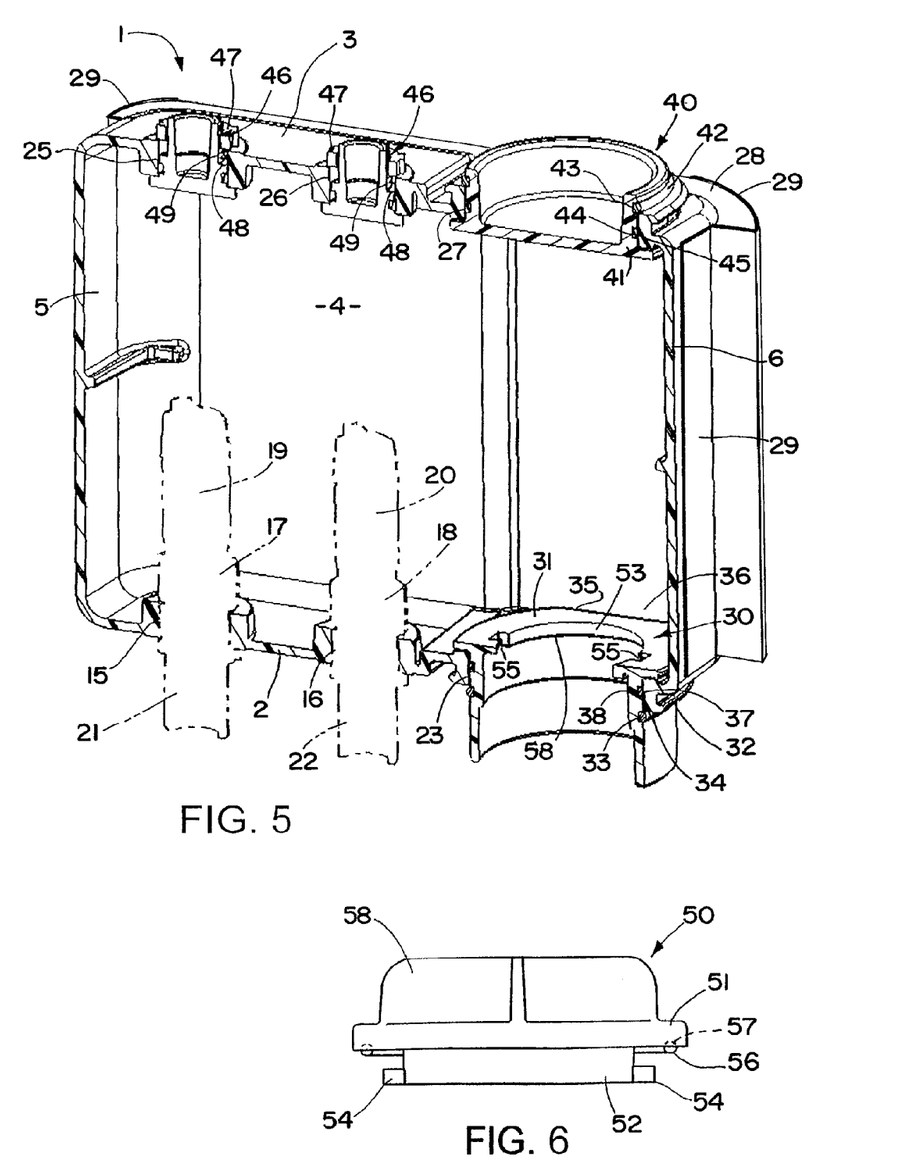
FIG. 5 is a fragmentary perspective longitudinal section through the supply box of FIG. 4.
FIG. 6 is an enlarged side elevation view of a test cap for sealing off a drain outlet in the bottom of the plumbing supply box during pressure testing of a sanitary drainage system to which the drain outlet is connected.

A tubular drain adaptor 30 made out of a suitable thermoplastic material may be inserted into the drain opening 23 in the bottom of the box from inside the box to permit solvent welding or otherwise attaching a thermoplastic drain pipe to the outer end of the adaptor for establishing fluid communication with the drain pipe through the adaptor. Such adaptor may be retained in place as by providing a stop flange 31 on the inner end of the adaptor for engagement with an interior surface of the bottom wall 2 surrounding the drain opening and a split wire retaining ring 32 in an external groove 33 in the adaptor for engagement with the bottom edge 34 of the drain opening (see FIGS. 3 and 5). Turning of the adaptor in the drain opening may be prevented as by providing a straight edge 35 on the side of the stop flange 31 that is in close proximity to and substantially parallel with the interior surface 36 of the back wall 4 of the box when the adaptor is inserted into the drain opening as best seen in FIG. 5. An O-ring seal 37 in another external groove 38 in the adaptor establishes a fluid seal with the drain opening 23.

A thermoset plastic plug 40 may be used to close off the unused drain opening 27 in the top wall of the box as by inserting the plug into the drain opening from inside the box. The plug may be held in place as by providing a stop flange 41 on the inner end of the plug for engagement with the inner surface of the top wall 3 and a split wire retaining ring 42 in an external groove 43 in the plug for engagement with an outer edge of the opening 27 similar to the way the tubular drain adaptor 30 is held in place. Likewise, another external groove 44 may be provided in the snap-in plug 40 containing an O-ring seal 45 for establishing a fluid seal with that particular opening. The other openings 25, 26 in the top wall (or openings 15, 16 in the bottom wall) to which conduit fittings for the shut-off valves and water lines are not connected may be closed using similar type thermoset plastic plugs 46 retained in place as by lock nuts 47. Also the plugs 46 may be sealed in the respective openings by O-ring seals 48 contained within external grooves 49 in the plugs as shown in FIG. 5.

A test cap of any suitable type may be used to temporarily seal off the drain opening to permit pressure testing of the sanitary drainage system to which the drain pipe is connected for any leaks. However, preferably a test cap of the type disclosed for example in U.S. Pat. No. 7,270,144 (the entire disclosure of which is incorporated herein by reference) is used, since it has the advantage that it may be quickly and easily installed and just as quickly and easily removed without having to destroy the test cap. This eliminates the risk of any portion of the test cap falling into the drain opening and possibly blocking flow therethrough and also permits the test cap to be reused.

One such test cap 50 is shown in FIG. 6 and includes a flange portion 51 and cylindrical portion 52 extending downwardly therefrom sized to closely fit within the drain opening 53 in the adaptor 30. Protruding outwardly from the cylindrical portion 52 are two or more tabs 54 sized and oriented to pass through corresponding notches 55 in the edge of adaptor drain opening 53 (see FIG. 5) when the tabs are aligned with the notches and the test cap is pushed downwardly. To provide a fluid tight seal between the test cap and adaptor 30, an O-ring seal 56 may be provided in a groove 57 on the bottom side of the test cap flange 51 radially outwardly of the notches 55 in the adaptor. Also ramps 58 (see FIG. 5) may be provided on the under side of the adaptor flange 31 leading away from the notches 55 in opposite directions for engagement by the tabs 54 on the test cap 50 during turning of the test cap in the tightening direction to cause the test cap seal 56 to press into sealing engagement with the adaptor flange.

A handle 58 may be provided on the upper side of the test cap flange for ease of turning the test cap in either direction. Once pressure testing of the sanitary drainage system to which the box is connected is completed, the test cap may be turned in the opposite direction to bring the tabs once again into alignment with the notches 55 in the edge of the adaptor drain opening 53, thus allowing the test cap to be removed for reuse.

Because the outlet adaptor 30 is made of a thermoplastic material, the adaptor may melt and collapse inside the wall if subjected to flames or high heat during a fire. Should this occur, the drain opening 23 in the bottom wall of the box is desirably closed off by installing relatively small intumescent pads 60 on one or more inner side walls of an enclosure 61 (see FIGS. 1-4) that may be suitably attached to the lower surface of the box around the drain opening. Enclosure 61 may be made of metal or other suitable material that has a high degree of structural integrity at high temperatures, including, for example, a suitable thermoset plastic material. When the box is exposed to sufficient heat to cause the adaptor to melt, the intumescent pads 60 within the enclosure will expand and form an insulating char to seal off the drain opening 23.

The amount of intumescent material 60 needed to seal off the drain opening 23 in the bottom wall 2 is far less than the amount that would be required to close off the entire opening in a fire rated wall in which the box is mounted if the entire box melted and collapsed in the wall upon being subjected to flames or high heat in a fire situation as would be the case if the entire box was made of a thermoplastic material. This provides a significant cost savings in the manufacture of the fire rated thermoset plastic boxes of the present invention. Also the cost of the thermoset plastic boxes of the present invention isn't likely to be any more than the cost of thicker walled thermoplastic boxes that would be required for fire rating purposes.

The enclosure 61 that is lined with intumescent pads 60 may be attached to the bottom of the box 1 as by providing spaced apart flanges 62 on opposite sides 63 of the enclosure that are engageable with grooves 64 in the exterior surface of the bottom wall of the box on opposite sides of the drain adaptor 30 to provide a snap connection therebetween. Also the enclosure 61 may have an axial opening 65 extending therethrough sized to receive the outer end of the adaptor 30 (see FIGS. 2 and 4) thus allowing the enclosure to be pushed up over the adaptor from below and snapped into place against the bottom wall of the box as shown in FIGS. 1-4.

Once the box 1 is properly installed in a stud bay and the water line and/or drain line connections are made and any pressure testing of the sanitary drainage system to which the drain pipe is connected is completed, suitable drywall or other sheet material is installed around the box to finish the wall. The drywall opening for the box 1 should be as close to the top, bottom and sides of the box as practicable. Any gaps between the box and drywall of, for example, up to ½ inch should be filled with drywall plaster. Any gaps larger than that should be sealed with firestop sealant substantially the entire thickness of the drywall. Finally an adjustable faceplate 66 may be inserted into the open front 67 of the box as shown in FIGS. 1 and 3 to give the installation a more finished appearance.

Figure 7:
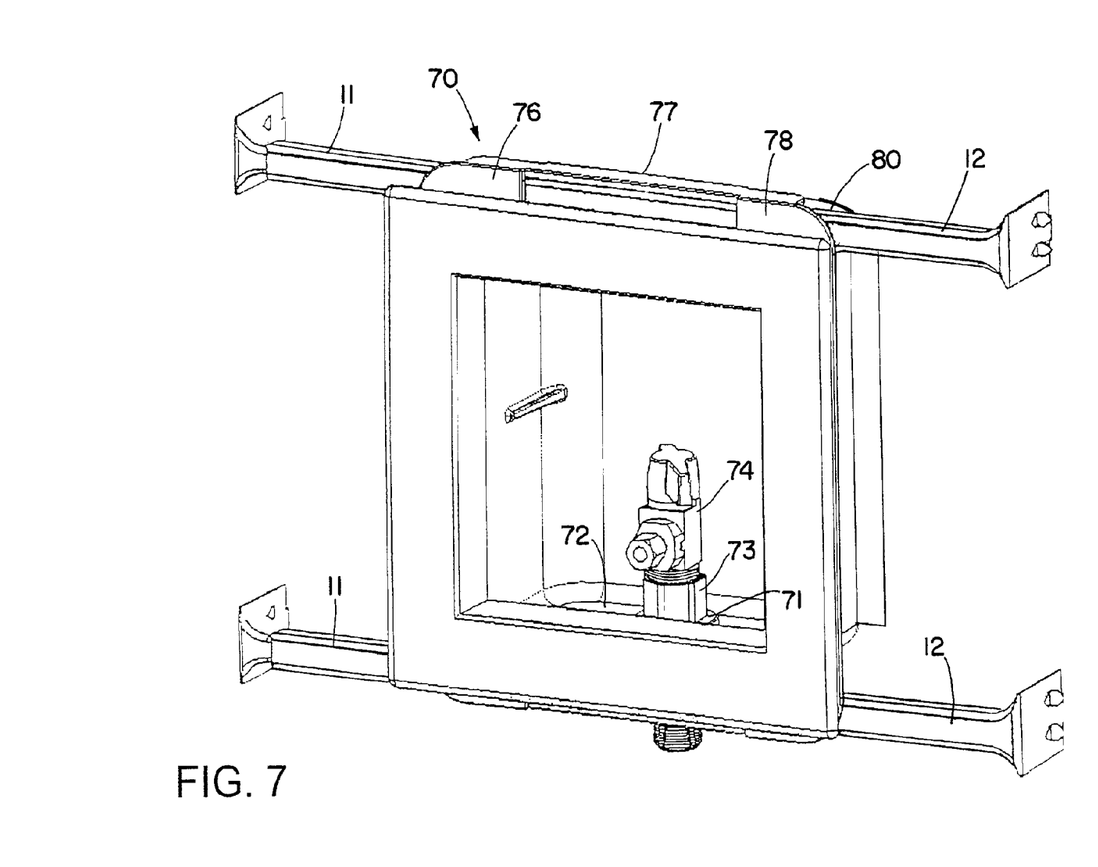
FIG. 7 is a front perspective view of another form of plumbing supply box of the present invention.
Figure 8:
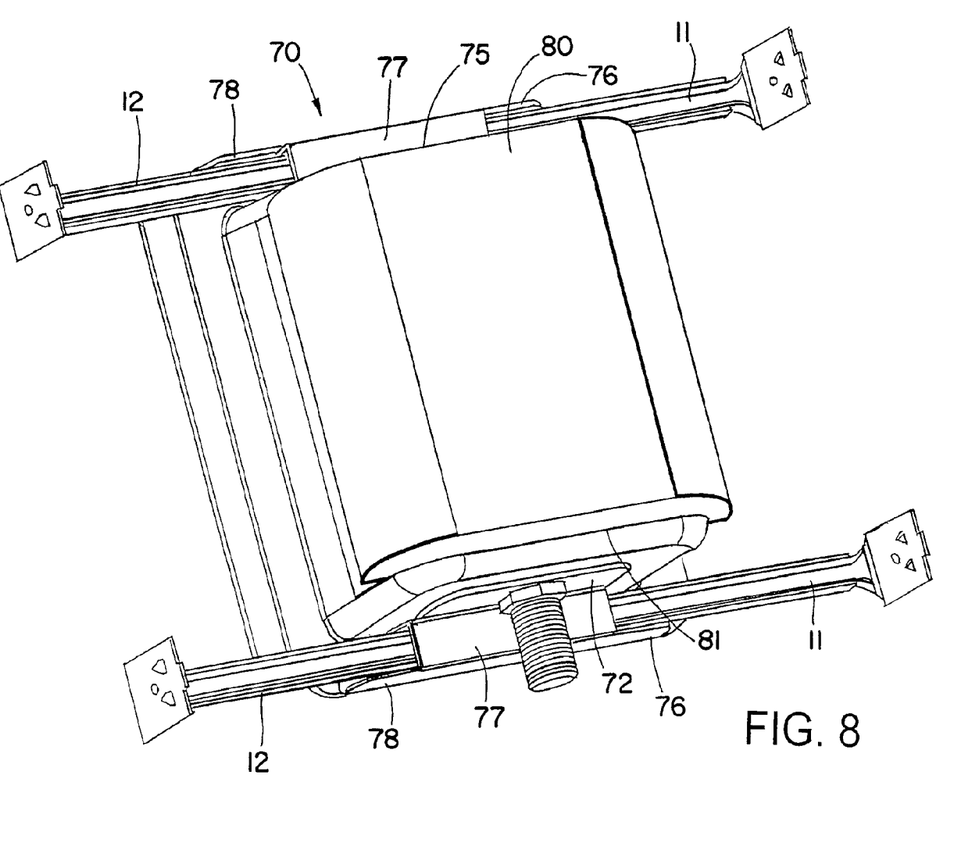
FIG. 8 is a rear perspective view of the plumbing supply box of FIG. 7.

As previously indicated, the box of the present invention may have any number of openings in the bottom wall (and top wall) depending on the particular application. For example, FIGS. 7 and 8 show a plumbing supply box 70 that only has one opening 71 in the bottom wall 72 for mounting a single conduit fitting 73 (with or without a water hammer arrester device) for connection of a single shut-off valve 74 and water supply line (not shown) to an ice maker. If the box needs to be fire rated for recess mounting in a fire rated wall, the box is desirably made of a suitable thermoset plastic material to provide the desired flame and temperature rating for the box, similar to the box 1 previously described. Also the box may include the same type of adjustable support brackets 11, 12 for mounting the box in a stud bay between stud walls having different spacings therebetween and to allow the box to be moved along the brackets in opposite directions for aligning the box with in-wall plumbing as before. One or both of the top and bottom walls 75 and 72 of the box may include alternately rearwardly and forwardly facing aligned channels 76, 77, 78 for sliding receipt of the support brackets 11, 12 within the channels.

In this case, since the box 70 shown in FIGS. 7 and 8 doesn't have a drain opening, there is no need for a thermoplastic drain adaptor for solvent welding of the box to a thermoplastic drain line or intumescent material for closing off the drain opening in the event of a fire. If needed to obtain the required fire rating for the box, a suitable insulation pad 80 may be attached to the back wall 81 of the box similar to the way the insulation pad 28 is attached to the back wall 4 of box 1.

Although the invention has been shown and described with respect to certain embodiments, it is obvious that equivalent alterations and modifications will occur to others skilled in the art upon the reading and understanding of the specification. In particular, with regard to the various functions performed by the above-described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function in the herein exemplary embodiments of the invention. In addition, while a particular feature of the invention may have been disclosed with respect to only one embodiment, such features may be combined with one or more other features as may be desired and advantageous to any given or particular application.

What is claimed is:

1. A plumbing supply box configured for recess mounting in a fire rated wall comprising:
    a body, the body having a top wall, a bottom wall opposite the top wall, a pair of sidewalls extending between the top wall and the bottom wall, and a rear wall connected to the top wall, the bottom wall, and the pair of sidewalls, the bottom wall defining a first opening and a second opening;
    an adaptor attached to the bottom wall of the body at the first opening, the adaptor having an adaptor wall extending away from the bottom wall of the body;
    an enclosure attached to the bottom wall of the body about the first opening and about the adaptor, the enclosure comprising a base that defines a third opening that is aligned with the first opening, the enclosure further comprising at least one sidewall extending between the base of the enclosure and the bottom wall of the body, wherein the bottom wall of the body, the base of the enclosure, and the at least one sidewall of the enclosure defining a cavity; and
    a pad disposed within the cavity and mounted to the at least one sidewall of the enclosure, the pad having a thickness that is less than a thickness of the adaptor wall, the pad comprising an intumescent material.

2. The plumbing supply box of claim 1 wherein the body comprises a thermoset plastic material.

3. The plumbing supply box of claim 2 wherein the body comprises a fiber reinforced bulk molding compound or a phenolic.

4. The plumbing supply box of claim 1 wherein the enclosure is made of a metal.

5. The plumbing supply box of claim 1 wherein the enclosure is made of a thermoset plastic material.

6. The plumbing supply box of claim 1 wherein the body further defines a pair of channels and the box further comprises a pair of telescopically connected support brackets disposed within the pair of channels, respectively, each of the telescopically connected support brackets having a pair of support plates configured to be secured to a stud wall.

7. The plumbing supply box of claim 6 wherein the pair of telescopically connected support brackets are axially compressible such that the body is movable in relation to each of the support plates.

8. The plumbing supply box of claim 1 wherein the top wall defines a fourth opening that is aligned with the first and third openings and a fifth opening that is aligned with the second opening.

9. The plumbing supply box of claim 1 wherein the bottom wall of the body further defines a pair of grooves and the enclosure further comprises a set of flanges that are each snapped into one of the pair of grooves, respectively.

10. The plumbing supply box of claim 1 further comprising a face plate mounted to at least one of the top wall, the bottom wall, and the pair of sidewalls.

11. The plumbing supply box of claim 1 wherein the pad has a smaller surface area than a surface area of the at least one sidewall of the enclosure.

12. The plumbing supply box of claim 1 wherein the adaptor wall extends from inside the body to an exterior of the body through the first opening.

13. The plumbing supply box of claim 1 wherein the adaptor includes a stop flange, the stop flange engaging with an interior surface of the bottom wall of the body surrounding the first opening.

14. The plumbing supply box of claim 1 wherein the pad is a first pad and the intumescent material is a first intumescent material, the plumbing supply box further comprising a second pad mounted to the rear wall, the second pad comprising a second intumescent material.

\* \* \* \* \*